United States Patent
Sun et al.

(10) Patent No.: US 12,281,016 B2
(45) Date of Patent: Apr. 22, 2025

(54) CONDUCTIVE COMPOSITE MATERIAL OF GRAPHENE, PREPARATION METHOD THEREFOR, USE THEREOF AND LITHIUM-ION BATTERY

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Sai Sun, Shanghai (CN); Siyu Zhang, Shanghai (CN); Wenqian Dong, Shanghai (CN); Huanxin Gao, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 0 days.

(21) Appl. No.: 18/246,866

(22) PCT Filed: Sep. 27, 2021

(86) PCT No.: PCT/CN2021/120911
§ 371 (c)(1),
(2) Date: Mar. 28, 2023

(87) PCT Pub. No.: WO2022/063292
PCT Pub. Date: Mar. 31, 2022

(65) Prior Publication Data
US 2023/0357019 A1 Nov. 9, 2023

(30) Foreign Application Priority Data

Sep. 28, 2020 (CN) .......................... 202011042741.8
Apr. 22, 2021 (CN) .......................... 202110438129.0

(51) Int. Cl.
*C01B 32/194* (2017.01)
*H01M 4/62* (2006.01)
*H01M 10/0525* (2010.01)

(52) U.S. Cl.
CPC ........... *C01B 32/194* (2017.08); *H01M 4/625* (2013.01); *H01M 10/0525* (2013.01);
(Continued)

(58) Field of Classification Search
CPC .......................... H01M 4/625; C01P 2002/82
See application file for complete search history.

(56) References Cited

U.S. PATENT DOCUMENTS

2011/0068290 A1* 3/2011 Haddon ............. G01N 33/6893
977/734
2019/0337806 A1 11/2019 Hunter et al.

FOREIGN PATENT DOCUMENTS

CN 103242513 A 8/2013
CN 108946713 A 12/2018
(Continued)

OTHER PUBLICATIONS

Sun, Sai et al.; "BODIPY-based conjugated polymer covalently grafted reduced graphene oxide for flexible nonvolatile memory devices"; Carbon; vol. 116; Feb. 16, 2017; ISSN. 0008-6223; pp. 713-721.
(Continued)

*Primary Examiner* — Khanh T Nguyen
(74) *Attorney, Agent, or Firm* — NKL Law; Allen Xue (57) ABSTRACT

A conductive composite material of graphene contains graphene nano-sheets and conjugated copolymers. The conju-
(Continued)

gated copolymers has alkynyl groups and are in a linear structure and grafted to the graphene nano-sheets. The preparation of conductive composite material includes the steps of: pretreating the graphene nano-sheets with 4-bromobenzenediazonium tetrafluoroborate, and forming the conjugated copolymers in the presence of the pretreated graphene nano-sheets. The conductive composite material of graphene can be uniformly dispersed in an electrode slurry, reduce the internal resistance of an electrode, and improve the electrical conductivity of an electrode. At the same time, the flexible structure associated with the graphene nano-sheets can buffer the volume expansion of the silicon-containing negative materials during charge-discharge cycling. Such a composite material can be in a lithium-ion battery.

18 Claims, 4 Drawing Sheets

(52) U.S. Cl.
CPC ...... *C01B 2204/04* (2013.01); *C01B 2204/22* (2013.01); *C01B 2204/32* (2013.01); *C01P 2002/82* (2013.01); *C01P 2004/03* (2013.01); *C01P 2004/24* (2013.01)

(56) References Cited

FOREIGN PATENT DOCUMENTS

| CN | 108975322 A | | 12/2018 | |
|----|----|----|----|----|
| CN | 109824041 A | | 5/2019 | |
| CN | 110171820 A | * | 8/2019 | ........... C01B 32/194 |
| CN | 110182792 A | | 8/2019 | |
| CN | 111509226 A | | 8/2020 | |
| WO | 2015015386 A1 | | 2/2015 | |
| WO | 2020126343 A1 | | 6/2020 | |

OTHER PUBLICATIONS

Turlakov, Gleb et al.; "Synthesis of reduced graphene oxide-poly(phenyleneethynylene hybrids. A supramolecular and photophysical analyses"; Polymer; vol. 122; Jun. 27, 2017; ISSN: 0032-3861; pp. 174-183.

Sun, Sai et al.; "In Situ Synthesis and Characterization of Poly(aryleneethynylene)-Grafted Reduced Graphene Oxide"; Chemistry—A European Journal; vol. 22, No. 7; Jan. 13, 2016; ISSN. 0947-6539; pp. 2247-2252.

Cao, Yaming et al.; "Organophosphorus-based polymer covalently functionalized reduced graphene oxide: In-situ synthesis and non-volatile memory effect"; Carbon; vol. 141; Sep. 24, 2018; ISSN: 0008-6223; pp. 758-767.

* cited by examiner

FIG. 8

CONDUCTIVE COMPOSITE MATERIAL OF GRAPHENE, PREPARATION METHOD THEREFOR, USE THEREOF AND LITHIUM-ION BATTERY

TECHNICAL FIELD

The present disclosure relates to lithium-ion batteries, particularly to conductive composite materials of graphene, their preparation methods and applications, and lithium-ion batteries.

BACKGROUND

Graphene is used as a new type of conductive agent. Graphene has a two-dimensional sheet structure. It imparts a lower conductivity threshold, which can significantly reduce the internal resistance and improve the performances at different current rates of batteries. It also imparts high flexibility, which can effectively alleviate the volume expansion associated with the charge-discharge cycling, improving the cycle performances of batteries. Accordingly, graphene is widely used as the conductive agent in lithium batteries. For example, CN109824041A discloses a graphene conductive agent used for a lithium battery and a preparation method thereof. A certain amount of graphite, a dispersant and a solvent are subjected to ball grinding and vibration separating via a screen to obtain the graphene conductive agent. When used as a cathode additive, it can significantly improve the comprehensive performances of lithium cobaltate cathode materials. CN108975322A discloses a method for preparing a graphene slurry, wherein expanded graphite is put into a dispersing medium, and subjected to soaking, stirring, and ultrasonic stripping to obtain the graphene slurry. It has been found that the conductive slurry of graphene prepared by subjecting graphite and solvents to treatments in ball mill, high-pressure or ultrasonic homogenizer is easy to agglomerate. At the same time, the slurry has poor stability and the graphene is in a form of thick sheet. Accordingly, it is regarded as of poor quality. To solve the above problems, CN111509226A discloses a graphene with carbon nanotubes formed on the surface thereof. The grafting of carbon nanotubes converses the graphene of a two-dimensional structure into a material of a three-dimensional structure, which may inhibit the problems associated with the stacking of graphene. However, the process has strict requirements on graphene and is complex, which leads to difficulty in applying in industrial scale.

Accordingly, there is still a demand for developing conductive composite materials of graphene with excellent dispersion property, easy preparation, low cost and high quality.

SUMMARY OF THE INVENTION

The subject of the invention is to solve one or more problems of composite materials of graphene in the prior art, such as uneven dispersion in solvents, easy agglomeration, large sheet thickness, and the like. Therefore, provided in the present disclosure is a new conductive composite material of graphene, its preparation method and application, and a lithium-ion battery containing the conductive composite material of graphene. The conductive composite material of graphene in accordance with the present disclosure is well dispersible in organic solvents, not easy to agglomerate, and has significantly improved conductivity.

The first aspect of the present disclosure relates to a conductive composite material of graphene, comprising graphene nano-sheets and conjugated copolymers, wherein the conjugated copolymers comprise alkynyl groups and are in a linear structure and grafted to the graphene nano-sheets.

The second aspect of the present disclosure relates to a method for preparing a conductive composite material of graphene which comprises graphene nano-sheets and conjugated copolymers, wherein the conjugated copolymers comprise alkynyl groups and are in a linear structure and grafted to the graphene nano-sheets, and wherein the method comprises the steps of:
  pretreating the graphene nano-sheets with 4-bromobenzenediazonium tetrafluoroborate, and
  forming the conjugated copolymers in the presence of the pretreated graphene nano-sheets.

The third aspect of the present disclosure relates to a conductive composite material of graphene prepared by the above method.

The fourth aspect of the present disclosure relates to a use of the above conductive composite material of graphene in lithium-ion batteries.

The fifth aspect of the present disclosure relates to a lithium-ion battery, comprising a negative electrode containing the conductive composite material of graphene in accordance with the present disclosure and a silicon-containing negative material, a positive electrode containing a lithium-containing positive material, a separator and an electrolyte.

The invention achieves the following technical effects:
1. The conductive composite material of graphene in accordance with the present disclosure involves conjugated copolymers grafted to the graphene nano-sheets. The grafted conjugated copolymers act as a "barrier layer" to inhibit the aggregation and accumulation of the graphene nano-sheets and thereby improve the dispersion of the resultant material in solvents. At the same time, the conjugated parts (moieties) in the conjugated copolymers are bonded via alkynyl groups, which opens channels for transferring electrons, and thereby is advantageous for transferring electrons between the graphene nano-sheets and the conjugated copolymers, as well as within the conjugated copolymers. In addition, the grafted conjugated copolymers also act as a "conductive brush". It not only reduces the conductive threshold of the graphene nano-sheets, but also extends the conductive structure of the graphene nano-sheets by extending the two-dimensional conductive plane into a three-dimensional space. When used in an electrode, all above can enhance the conductivity of the electrode and reduce the internal resistance thereof. At the same time, the flexible structure associated with the graphene nano-sheets can buffer the volume expansion of the silicon-containing negative materials during charge-discharge cycling. Accordingly, it may improve the structural stability of the negative electrode, and improve the comprehensive performances of the negative electrode. Accordingly, when the above materials are applied in a lithium-ion battery, the performances at different current rates and the cycling stability of the lithium battery are enhanced.
2. In the method for preparing the conductive composite material of graphene in accordance with the present disclosure, the graphene nano-sheets are pretreated with 4-bromobenzenediazonium tetrafluoroborate. Accordingly, halogen functional groups (bromide, iodide and the like) are introduced on the graphene nano-sheets. Then, the conjugated copolymers are grafted via the coupling reaction between the halogens and the conjugated copolymers. In this way, the grafted conjugated copolymers are evenly distributed on the surface of the graphene nano-sheets. Additionally, the conjugated copolymers are in a linear structure by selecting the monomers.

3. The method in accordance with the present disclosure has no limitation on the type of graphene nano-sheet feedstocks. Additionally, it is a simple process and thereby more suitable for industrial production.

DETAILED DESCRIPTION

It should be understood that the endpoints and any value in the ranges disclosed herein are not limited to the precise ranges or values, but encompass values close to those ranges or values. For ranges of values, it is possible to combine between the endpoints of each of the ranges, between the endpoints of each of the ranges and the individual points, and between the individual points to give one or more new ranges of values as if these ranges of values are specifically disclosed herein.

Other than in the examples, all numerical values of parameters in this specification are to be understood as being modified in all instances by the term "about" whether or not "about" actually appears before the numerical values.

As used in this specification, the term "graphene" refers to a two-dimensional material composed of a single layer of $sp^2$ hybridized carbon atoms accumulated into a honeycomb structure. Graphene is usually prepared by mechanical stripping, oxidation-reduction, SiC epitaxial growth, and the like. Therefore, the term "graphene" also includes graphene oxide, reduced graphene oxide, and the like.

As used in this specification, the term "graphene nano-sheet" refers to a layered assembly of graphene, which may contain one to ten layers of graphene. Accordingly, graphene nano-sheets include single-layer graphene (which can be simply referred to as graphene), double-layer graphene, as well as low-layer graphene comprising 3-10 layers of graphene. It is generally believed that when the number of layers is less than or equal to 10, the layered assembly of graphene has properties similar to graphene (single-layer graphene). Accordingly, it is named as graphene nano-sheets. When the number of layers exceeds 10, the properties of the layered assembly of graphene are similar to those of graphite. The thickness of graphene nano-sheets is at nanometer scale, and the other two dimensions are usually larger than nanometer scale. In one variant, the plane dimension of the graphene nano-sheets is 0.05-5.0 µm.

As used in this specification, the plane dimension refers to the maximum radial dimension of the material on the X-Y plane. In the present disclosure, unless otherwise indicated, the plane dimension of the graphene nano-sheets may be characterized by scanning electron microscope or atomic force microscope.

In one aspect of the present disclosure, provided is a conductive composite material of graphene, comprising graphene nano-sheets and conjugated copolymers, wherein the conjugated copolymers comprise alkynyl groups and are in a linear structure and grafted to the graphene nano-sheets.

The conductive composite material of graphene has a specific surface area of 50-300 m$^2$/g, preferably 100-250 m$^2$/g. The conductive composite material of graphene has a conductivity of 200-800 S/cm.

In one variant, the conductive composite material of graphene involves in the Raman spectrum a D peak and a G peak which have the peak heights of $I_D$ and $I_G$ respectively, where $I_D/I_G$ is less than 0.50. In one variant, $I_D/I_G$ may be 0.01-0.50, preferably 0.03-0.30, for example, but not limited to 0.01, 0.02, 0.03, 0.04, 0.05, 0.06, 0.07, 0.08, 0.09, 0.10, 0.15, 0.20, 0.25, 0.30, 0.35, 0.40, 0.45, 0.50 and the like.

Raman spectroscopy is widely used in analyzing carbon materials. The Raman spectrum of graphene materials may be composed of several peaks, mainly G, D and G'. G peak is the main characteristic peak of graphene, which is attributable to the in-plane vibration of $sp^2$ hybridized carbon atoms. It can effectively reflect the number of grapheme layers in the graphene samples. D peak is usually regarded as the disordered vibration peak of graphene, which is used to characterize structural defects in the graphene samples. G' peak, also known as 2D peak, is a two-phonon resonance second-order Raman peak, which may be used to characterize the interlayer stacking type of carbon atoms in the graphene samples. In the Raman spectrum of the conductive composite material of graphene, there are a D peak in the wavelength range of 1250-1450 cm$^{-1}$ with a peak height of $I_D$, a G peak in the wavelength range of 1500-1700 cm$^{-1}$ with a peak height of $I_G$, and a 2D peak in the wavelength range of 2600-2800 cm$^{-1}$ with a peak height of $I_{2D}$. Raman spectroscopy has advantages in characterizing the defects of graphene materials. It is generally believed that the defect density is proportional to $I_D/I_G$. The conductive composite material of graphene has a lower $I_D/I_G$, indicating fewer defects therein.

Based on the total amount of the conductive composite material of graphene, the graphene nano-sheets are present in an amount of 75%-99% by mass, preferably 85%-99% by mass, and the conjugated copolymers are present in an amount of 1%-25% by mass, preferably 1%-15% by mass.

The graphene nano-sheets are low-layer graphene, preferably low-layer graphene comprising 3-5 layers of graphene.

The graphene nano-sheets may involve in the Raman spectrum a D peak and a G peak which have the peak heights of $I_D$ and $I_G$ respectively, where $I_D/I_G$ is less than 0.50. In one variant, $I_D/I_G$ may be 0.01-0.50, preferably 0.03-0.30, for example, but not limited to 0.01, 0.02, 0.03, 0.04, 0.05, 0.06, 0.07, 0.08, 0.09, 0.10, 0.15, 0.20, 0.25, 0.30, 0.35, 0.40, 0.45, 0.50 and the like.

In the Raman spectrum of the graphene nano-sheets, there are a D peak in the wavelength range of 1250-1450 cm$^{-1}$ with a peak height of $I_D$, a G peak in the wavelength range of 1500-1700 cm$^{-1}$ with a peak height of $I_G$, and a 2D peak in the wavelength range of 2600-2800 cm$^{-1}$ with a peak height of $I_{2D}$. The graphene nano-sheets have a lower $I_D/I_G$, indicating fewer defects therein.

The graphene nano-sheets are available commercially or can be prepared according to the methods known in the art.

In one variant, the graphene nano-sheets may be prepared by:
(1) heating an expandable graphite to 800-950° C. for 10-60s to operate expansion treatment, to obtain a pre-expanded graphite;
(2) mixing the pre-expanded graphite obtained in step (1), aliphatic amine polyoxyethylene ether and water, and then subjecting to the first high-pressure homogenization treatment and the second high-pressure homogenization treatment in order, to obtain a slurry containing stacks of graphene nano-sheets,
wherein the first high-pressure homogenization treatment is operated at a pressure of 30-40 MPa for 20-60 min, the second high-pressure homogenization treatment is operated at a pressure of 40-50 MPa for 10-30 min, wherein the pressure of the second high-pressure homogenization treatment is 10-20 MPa higher than the pressure of the first high-pressure homogenization treatment;
(3) drying the slurry obtained in step (2) to obtain the stacks of graphene nano-sheets.

In one variant, as compared with the expandable graphite, the pre-expanded graphite obtained in step (1) has an expansion rate of 200-300 times.

In the conjugated copolymers, alkynyl groups bond to conjugated moieties comprising conjugated groups, such as those independently selected from phenyl rings, polycyclic aromatic hydrocarbons, aromatic heterocycles and the like.

Preferably, the conjugated copolymers are one or more of copolymers of arylalkyne, copolymers of fluorene, copolymers of p-phenylenevinylene, copolymers of p-phenyleneethynylene, copolymers of thiophene, copolymers of thiophene derivatives, copolymers of pyrrole, copolymers of pyrrole derivatives; and further preferably, at least one of copolymers of arylalkyne, copolymers of fluorene, copolymers of thiophene, and copolymers of thiophene derivatives. For example, the copolymers of arylalkyne may be poly(1,4-dialkynylbenzene-co-triphenylamine). The copolymers of fluorene may be poly(1,4-dialkynylbenzene-co-9-hexylfluorene). The copolymers of thiophene may be at least one of poly(1,4-dialkynylbenzene-co-3-hexylthiophene) and poly (1,4-dialkynylbenzene-co-thiophene). The copolymers of thiophene derivatives may be poly(1,4-dialkynylbenzene-co-3,4-ethylene dioxy thiophene).

In another aspect of the present disclosure, provided is a method for preparing a conductive composite material of graphene which comprises graphene nano-sheets and conjugated copolymers, wherein the conjugated copolymers comprise alkynyl groups and are in a linear structure and grafted to the graphene nano-sheets, and wherein the method comprises the steps of:
pretreating the graphene nano-sheets with 4-bromobenzenediazonium tetrafluoroborate, and
forming the conjugated copolymers in the presence of the pretreated graphene nano-sheets.

In one embodiment, the pretreating is operated by: under intense stirring, dripping an aqueous solution of 4-bromobenzenediazonium tetrafluoroborate into an aqueous dispersion of the graphene nano-sheets, and treating at a temperature of −5° C. to 40° C. for 30-180 min, then subjecting to solid-liquid separation, and washing and drying the obtained solids, to obtain the pretreated graphene nano-sheets. In one variant, the aqueous solution of 4-bromobenzenediazonium tetrafluoroborate has a concentration of 40%-70% by mass. The aqueous dispersion of the graphene nano-sheets comprises the graphene nano-sheets in a concentration of 5%-50% by mass. The aqueous dispersion of the graphene nano-sheets is obtained by adding the graphene nano-sheets into water and dispersing. The dispersing may be operated by stirring, ultrasonic treating and the like. In the pretreating, 4-bromobenzenediazonium tetrafluoroborate and the graphene nano-sheets are in a mass ratio of 3-6:1. The solid-liquid separation may be operated by filtrating. In order to make the separation easier, organic solvents such as acetone may be added before separation. The washing may be operated with organic solvents (such as acetone, dimethyl formamide (DMF), and the like) and deionized water. The washing may be operated one or more times. The drying may be vacuum drying, preferably at 60-80° C. for 2-10h.

The forming the conjugated copolymers in the presence of the pretreated graphene nano-sheets may comprise: polymerizing monomers for forming the conjugated copolymers in the presence of catalysts, solvents and the pretreated graphene nano-sheets, to obtain the conductive composite material of graphene.

The catalysts may be at least one selected from the group consisting of palladium catalysts (wherein palladium is Pd[0], Pd[I] or Pd[II]) and nickel catalysts (wherein nickel is Ni[0] or Ni[II]). The catalysts are in an amount of 0.5%-3.0% of the molar weight of monomers.

The monomers for forming the conjugated copolymers may comprise at least two monomers, wherein the first monomer contains halogen, preferably, any one of bromine and iodine, and wherein the second monomer is a compound containing an alkynyl group. The first monomer and the second monomer may be in a molar ratio of 1:1-1.1. The specific monomers may be those commonly used for forming conjugated copolymers. For example, the first monomer may be one or more of 4,4'-dibromotriphenylamine, 1,4-dibromobenzene, 1,4-diiodiobenzene, 2,7-dibromofluorene, 2,7-dibromo-9-hexylfluorene, 2,5-dibromothiophene, 2,5-dibromo-3-hexylthiophene and the like. For example, the second monomer may be at least one of 1,4-diethynylbenzene, 1,3-diethynylbenzene, 4,4'-diethynylbiphenyl, and the like.

The solvents may be at least one of N,N'-dimethylformamide and N-methylpyrrolidone. The solvents may be added in an amount of 1%-10% by mass of the monomers.

In one variant, the polymerizing is operated under the conditions of: under inert atmosphere and at the temperature of 80-150° C. for 12 h-36 h. The inert atmosphere may be nitrogen atmosphere.

Optionally, the products of the polymerizing may be treated by conventional post-treatment steps, such as solid-liquid separation, washing, drying, and the like. The solid-liquid separation may be filtration. In order to make the separation easier, organic solvents such as methanol may be added before the separation. The washing may use organic solvent (such as methanol) and deionized water as washing liquid. The washing may be operated one or more times. The drying may be operated under vacuum, preferably at 60-80° C. for 2-10 h.

The conductive composite material of graphene in accordance with the present disclosure has excellent solvent dispersibility and conductivity, and thereby is particularly suitable for the use in lithium-ion batteries.

In further aspect of the present disclosure, provided is a lithium-ion battery, comprising a negative electrode containing the conductive composite material of graphene in accordance with the present disclosure and a silicon-containing negative material, a positive electrode containing a lithium-containing positive material, a separator and an electrolyte.

The lithium-ion battery in accordance with the present disclosure may have a structure well known to those skilled persons in the art. In general, the separator is disposed between the positive electrode and the negative electrode. The positive electrode contains a positive material and the negative electrode contains the silicon-containing negative material and the conductive composite material of graphene. There is not any special limitation on the chemical composition of the positive material. It may be a lithium-containing positive material commonly used in the art.

The separator may be selected from various separators known to those skilled persons in the art and commonly used in lithium-ion batteries, such as polypropylene microporous films, polyethylene mat, glass fiber mat or ultra-fine glass fiber paper.

The electrolyte may be various conventional electrolytes, such as non-aqueous electrolyte. The non-aqueous electrolyte is a solution formed by an electrolyte lithium salt in a non-aqueous solvent. Any traditional non-aqueous electrolyte known to those skilled persons in the art may be used. For example, the electrolyte may be at least one selected from the group consisting of lithium hexafluorophosphate ($LiPF_6$), lithium perchlorate ($LiClO_4$), lithium tetrafluoroborate ($LiBF_4$), lithium hexafluoroarsenate ($LiAsF_6$) and lithium hexafluorosilicate ($LiSiF_6$). The non-aqueous solvents may be selected from the group consisting of linear esters and cyclic esters and mixtures thereof. The linear esters may be at least one selected from the group consisting of dimethyl carbonate (DMC), diethyl carbonate (DEC), methyl ethyl carbonate (EMC), methyl propyl carbonate (MPC) and dipropyl carbonate (DPC). The cyclic esters may be at least one selected from the group consisting of ethylene carbonate (EC), propylene carbonate (PC) and vinylene carbonate (VC).

EXAMPLES

The invention will be described in detail below through the following examples.

In the following examples and comparative examples, scanning electron microscopy was used to characterize the morphology of materials. Specifically, the scanning electron microscope used was TECNALG2F20 (200 kv) from FEI company, US. Tests were operated by: pressing the sample directly on the sample table containing a conductive tape, and then inserting into the electron microscope for observation. A magnification of 8,000 times was used for observation.

In the following examples and comparative examples, the electrochemical properties of the obtained lithium-ion batteries after the assembling were tested with the Wuhan blue battery test system (CT2001B). The test conditions included a voltage range of 0.005V-3V and a current range of 0.05 A-2 A. Each sample was assembled into 10 coin cells. Their battery performances were tested under the same voltage and current. The average value thereof was used as the measured result.

The infrared spectrum was measured on Spectrum 100 (obtained from Perkin Elmer) Fourier transform infrared spectrometer according to the potassium bromide tablet method.

The test conditions included a scanning range of from 500 $cm^{-1}$ to 4000 $cm^{-1}$. Scanning signals were collected 32 times for each sample.

The specific surface area was measured on ASAP2010 specific surface area and pore size distribution tester from Micromeritics, US. Test conditions included a temperature of 77K and a nitrogen atmosphere.

The Raman spectrum was tested by using a laser with a wavelength of 785 nm as excitation source. Used was Invia/Reflrx Laser Micro-Raman spectrometer wherein the material samples were placed on the slide.

In the following examples and comparative examples, the room temperature referred to 25° C.

In the following examples and comparative examples, 4-bromobenzenediazonium tetrafluoroborate, tetra(triphenylphosphine) palladium [$Pd(PPh_3)_4$], triethylamine, cuprous iodide (CuI), 1,4-diethynylbenzene, 4,4'-dibromotriphenylamine, N,N'-dimethylformamide (DMF) were commercially available from Shanghai Aladdin Biochemical Technology Co., Ltd. The graphene nano-sheet feedstocks were commercially available from the Sixth Element Changzhou Materials Technology Co., Ltd., which were low-layer graphene with a plane dimension of 2.0-5.0 μm.

Example 1

(1) 25 g of 4-bromobenzenediazonium tetrafluoroborate was dissolved in 25 mL of water to obtain solution A. Under intense stirring, the solution A was dripped into 15 g of an aqueous dispersion of graphene nano-sheets (with 5 g of graphene nano-sheets). The mixture was stirred at room temperature for 1 h, then poured into acetone, filtered to get solids, which were washed with acetone, DMF and deionized water for once respectively, and dried in vacuum (at a temperature of 60° C. for 4 h), to obtain the pretreated graphene nano-sheets, recorded as A-1.

(2) 1 g of A-1 was ultrasonically dispersed in 100 mL of N,N'-dimethylformamide. Under nitrogen atmosphere, 326 mg of 4,4'-dibromotriphenylamine, 138.6 mg of 1,4-diethynylbenzene, 35 mg of tetra(triphenylphosphine) palladium, 7 mg of cuprous iodide and 4 mL of triethylamine were added into the dispersion. The reaction mixture was heated to 80° C. under nitrogen atmosphere and stirred for 72 hours.

(3) After the reaction, the reaction liquid was poured into methanol. The mixture was filtered in vacuum to obtain a black solid product. Subsequently, the obtained product was washed with methanol and deionized water for several times to remove the unreacted monomers and catalysts, and dried in a vacuum oven (at a temperature of 60° C. for 12 h) to obtain a conductive composite material of graphene, A-2, which was graphene nano-sheets grafted with copolymers of arylalkyne, wherein the graphene nano-sheets were in a mass content of 98.2%.

For comparison, a conjugated copolymer A-3 was prepared as follow. 326 mg of 4,4'-dibromotriphenylamine, 138.6 mg of 1,4-diethynylbenzene were added to 100 mL of N,N'-dimethylformamide. After stirring to dissolve materials, 35 mg of tetra(triphenylphosphine) palladium, 7 mg of cuprous iodide and 4 mL of triethylamine were added. The reaction mixture was heated to 80° C. under nitrogen atmosphere and stirred for 72 h. After the reaction, the reaction liquid was poured into methanol. The mixture was filtered in vacuum to obtain a brown solid product. The obtained product was washed with methanol and deionized water for several times to remove the unreacted monomers and catalysts, and dried in a vacuum oven (at a temperature of 60° C. for 12 h). The product was the conjugated copolymer A-3.

The specific surface areas of A-1, A-2 and A-3 were detected according to the BET method as described above. The results showed that, the pretreated graphene nano-sheets A-1 had a specific surface area of 420 m$^2$/g, the conductive composite material of grapheme A-2 had a specific surface area of 185 m$^2$/g, and the comparative conjugated polymer A-3 had a specific surface area of 5.5 m$^2$/g. The above results showed that the surface morphology of graphene nano-sheets changed after grafting the polymers. That is, the polymers were coated on the surface of the graphene nano-sheets, and thereby the specific surface area of the graphene nano-sheets per se was reduced.

Figure 1:
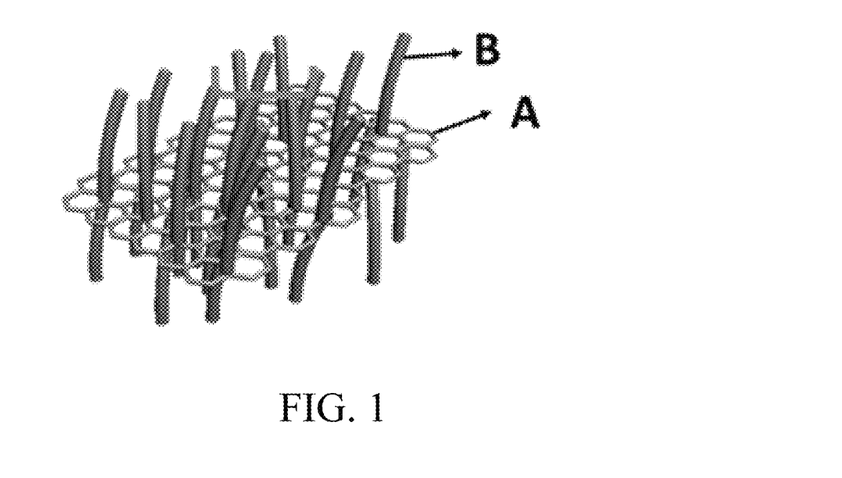
FIG. 1 is a schematic view showing the structure of the conductive composite material of graphene obtained in Example 1, wherein A is graphene and B is conjugated copolymers.
Figure 2:
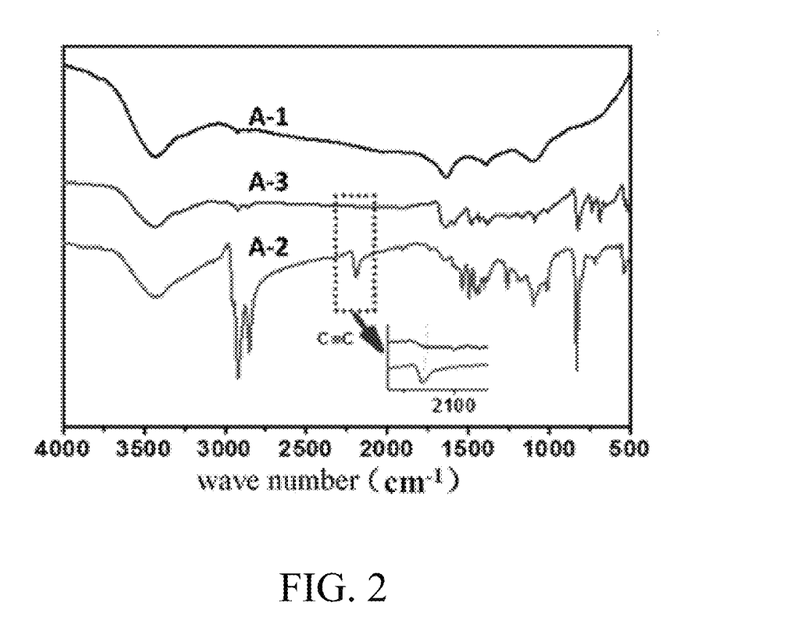
FIG. 2 shows the infrared spectra of A-1, A-2 and A-3 obtained in Example 1.

The infrared spectra of A-1, A-2 and A-3 were obtained by the test method as described above. The results were shown in FIG. 2. As could be seen from the drawings, A-2 and A-3 had absorption peaks of —C≡C— at 2170 cm$^{-1}$ and 2150 cm$^{-1}$ respectively, which proved the presence of alkynyl structures in A-2 and A-3. In addition, the absorption peaks of A-2 were redshifted 20 cm$^{-1}$ as compared with those of A-3. The reason might be that the graphene nano-sheets in A-2 were connected with the conjugated polymers A-3 through the structure of —C$_6$H$_6$—C≡C—, resulting in the flow of electron clouds between the graphene nano-sheets and the polymers. It indicated that the conjugated copolymers had successfully grafted to the graphene nano-sheets, forming the conductive composite material of graphene.

Figure 3:
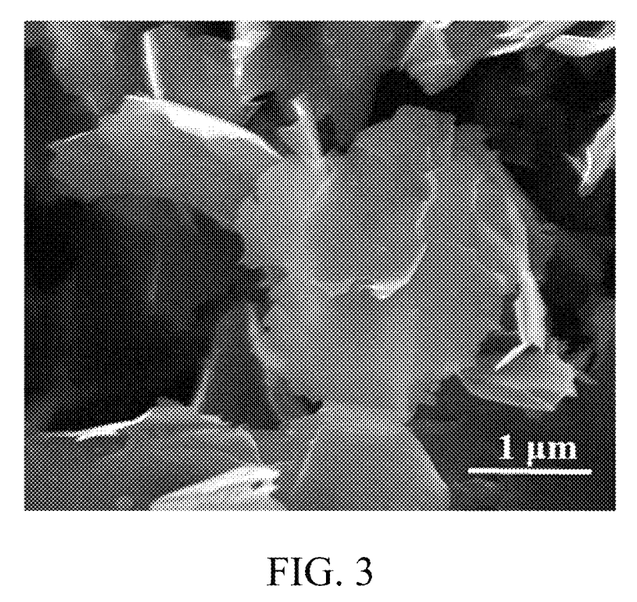
FIG. 3 shows a SEM image of the conductive composite material of graphene obtained in Example 1.
Figure 4:
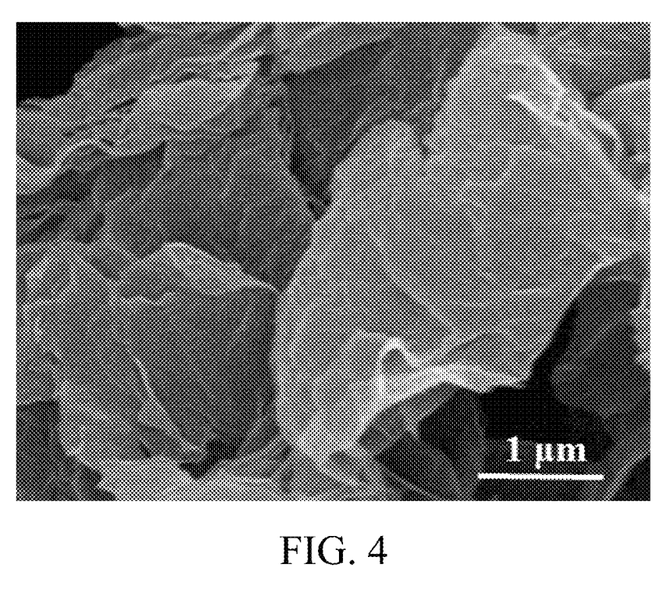
FIG. 4 shows a SEM image of the graphene nano-sheet feedstocks involved in Example 1.
Figure 5:
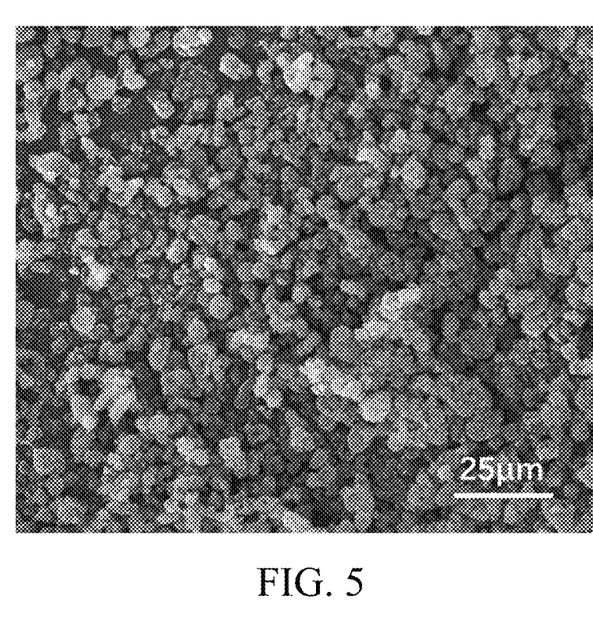
FIG. 5 shows a SEM image of A-3 obtained in Example 1.

FIG. 3 showed a SEM image of the conductive composite material of grapheme A-2 obtained in Example 1. FIG. 4 showed a SEM image of the graphene nano-sheet feedstocks involved in Example 1. FIG. 5 showed a SEM image of A-3. By comparing FIG. 3 with FIG. 4, it could be found that the surface of the grafted graphene nano-sheets was smoother and there was no stacking of layers. In contrast, the stacking was more obvious in the graphene nano-sheet feedstocks. FIG. 5 showed that, when the conjugated copolymers were prepared in the absence of the pretreated graphene nano-sheets, the resultant conjugated copolymers were only in a form of small balls.

The Raman spectrum of the conductive composite material of graphene A-2 obtained in Example 1 was obtained by the test method as described above. The results showed a D peak at 1354 cm$^{-1}$, and a G peak at 1574 cm$^{-1}$ with a ratio of their peak heights ($I_D/I_G$) of 0.09.

Example 2

(1) 25 g of 4-bromobenzenediazonium tetrafluoroborate was dissolved in 35 mL of water to obtain solution A. Under intense stirring, the solution A was dripped into 15 g of an aqueous dispersion of graphene nano-sheets (with 5 g of graphene nano-sheets). The mixture was stirred at room temperature for 1 h, then poured into acetone, and filtered to get solids, which were washed with acetone, DMF and deionized water for once respectively, and dried in vacuum (at a temperature of 60° C. for 4h), to obtain the pretreated graphene nano-sheets, recorded as A-4.

(2) 1 g of A-4 was ultrasonically dispersed in 100 mL of N,N'-dimethylformamide. Under nitrogen atmosphere, 326 mg of 4,4'-dibromotriphenylamine, 138.6 mg of 1,4-diethynylbenzene, 35 mg of tetra(triphenylphosphine) palladium, 7 mg of cuprous iodide and 4 mL of triethylamine were added into the dispersion. The reaction mixture was heated to 80° C. under nitrogen atmosphere and stirred for 72 hours.

(3) After the reaction, the reaction liquid was poured into methanol. The mixture was filtered in vacuum to obtain a black solid product. Subsequently, the obtained product was washed with methanol and deionized water for several times to remove the unreacted monomers and catalysts, and dried in a vacuum oven (at a temperature of 60° C. for 12 h) to obtain a conductive composite material of graphene, A-5, which was graphene nano-sheets grafted with copolymers of arylalkyne, wherein the graphene nano-sheets were in a mass content of 86.5%.

The specific surface area of A-5 was detected according to the BET method as described above. The results showed that the conductive composite material of graphene A-5 had a specific surface area of 120 m$^2$/g. As compared with Example 1, more amounts of conjugated polymers were grafted in Example 2, which made the specific surface area of the conductive composite material of graphene further reduce.

The Raman spectrum of the conductive composite material of graphene A-5 obtained in Example 2 was obtained by the test method as described above. The results showed a D peak at 1354 cm$^{-1}$, and a G peak at 1580 cm$^{-1}$ graphene with a ratio of their peak heights ($I_D/I_G$) of 0.07.

Example 3

(1) 25 g of 4-bromobenzenediazonium tetrafluoroborate was dissolved in 12 mL of water to obtain solution A. Under intense stirring, the solution A was dripped into 15 g of an aqueous dispersion of graphene nano-sheets (with 5 g of graphene nano-sheets). The mixture was stirred at room temperature for 1 h, then poured into acetone, filtered to get solids, which were washed with acetone, DMF and deionized water for once respectively, and dried in vacuum (at a temperature of 60° C. for 4h), to obtain the pretreated graphene nano-sheets, recorded as A-6.

(2) 1 g of A-6 was ultrasonically dispersed in 100 mL of N,N'-dimethylformamide. Under nitrogen atmosphere, 326 mg of 4,4'-dibromotriphenylamine, 138.6 mg of 1,4-diethynylbenzene, 35 mg of tetra(triphenylphosphine) palladium, 7 mg of cuprous iodide and 4 mL of triethylamine were added into the dispersion. The reaction mixture was heated to 80° C. under nitrogen atmosphere and stirred for 72 hours.

(3) After the reaction, the reaction liquid was poured into methanol. The mixture was filtered in vacuum to obtain a black solid product. Subsequently, the obtained product was washed with methanol and deionized water for several times to remove the unreacted monomers and catalysts, and dried in a vacuum oven (at a temperature of 60° C. for 12 h) to obtain a conductive composite material of graphene, A-7, which was graphene nano-sheets grafted with copolymers of arylalkyne, wherein the graphene nano-sheets were in a mass content of 90.5%.

The specific surface area of A-7 was detected according to the BET method as described above. The results showed that the conductive composite material of graphene A-7 had a specific surface area of 144 m$^2$/g.

The Raman spectrum of the conductive composite material of graphene A-7 obtained in Example 3 was obtained by the test method as described above. The results showed a D peak at 1354 cm$^{-1}$, and a G peak at 1580 cm$^{-1}$ with a ratio of their peak heights ($I_D/I_G$) of 0.07.

Example 4

(1) 25 g of 4-bromobenzenediazonium tetrafluoroborate was dissolved in 25 mL of water to obtain solution A. Under intense stirring, the solution A was dripped into 10 g of an aqueous dispersion of graphene nano-sheets (with 5 g of graphene nano-sheets). The mixture was stirred at room temperature for 1 h, then poured into acetone, and filtered to get solids, which were washed with acetone, DMF and deionized water for once respectively, and dried in vacuum (at a temperature of 60° C. for 4h), to obtain the pretreated graphene nano-sheets, recorded as A-8.

(2) 1 g of A-8 was ultrasonically dispersed in 100 mL of N,N'-dimethylformamide. Under nitrogen atmosphere, 326 mg of 4,4'-dibromotriphenylamine, 138.6 mg of 1,4-diethynylbenzene, 35 mg of tetra(triphenylphosphine) palladium, 7 mg of cuprous iodide and 4 mL of triethylamine were added into the dispersion. The reaction mixture was heated to 80° C. under nitrogen atmosphere and stirred for 72 hours.

(3) After the reaction, the reaction liquid was poured into methanol. The mixture was filtered in vacuum to obtain a black solid product. Subsequently, the obtained product was washed with methanol and deionized water for several times to remove the unreacted monomers and catalysts, and dried in a vacuum oven (at a temperature of 60° C. for 12 h) to obtain a conductive composite material of graphene, A-9, which was graphene nano-sheets grafted with copolymers of arylalkyne, wherein the graphene nano-sheets were in a mass content of 92.4%.

The specific surface area of A-9 was detected according to the BET method as described above. The results showed that the conductive composite material of graphene A-9 had a specific surface area of 152 m$^2$/g.

The Raman spectrum of the conductive composite material of graphene A-9 obtained in Example 4 was obtained by the test method as described above. The results showed a D peak at 1354 cm$^{-1}$, and a G peak at 1580 cm$^{-1}$ with a ratio of their peak heights ($I_D/I_G$) of 0.07.

Example 5

(1) 25 g of 4-bromobenzenediazonium tetrafluoroborate was dissolved in 25 mL of water to obtain solution A. Under intense stirring, the solution A was dripped into 15 g of an aqueous dispersion of graphene nano-sheets (with 7.5 g of graphene nano-sheets). The mixture was stirred at room temperature for 1 h, then poured into acetone, filtered to get solids, which were washed with acetone, DMF and deionized water for once respectively, and dried in vacuum (at a temperature of 60° C. for 4h), to obtain the pretreated graphene nano-sheets, recorded as A-10.

(2) 1 g of A-10 was ultrasonically dispersed in 100 mL of N,N'-dimethylformamide. Under nitrogen atmosphere, 326 mg of 4,4'-dibromotriphenylamine, 138.6 mg of 1,4-diethynylbenzene, 35 mg of tetra(triphenylphosphine) palladium, 7 mg of cuprous iodide and 4 mL of triethylamine were added into the dispersion. The reaction mixture was heated to 80° C. under nitrogen atmosphere and stirred for 72 hours.

(3) After the reaction, the reaction liquid was poured into methanol. The mixture was filtered in vacuum to obtain a black solid product. Subsequently, the obtained product was washed with methanol and deionized water for several times to remove the unreacted monomers and catalysts, and dried in a vacuum oven (at a temperature of 60° C. for 12 h) to obtain a conductive composite material of graphene, A-11, which was graphene nano-sheets grafted with copolymers of arylalkyne, wherein the graphene nano-sheets were in a mass content of 94.6%.

The specific surface area of A-11 was detected according to the BET method as described above. The results showed that the conductive composite material of graphene A-11 had a specific surface area of 155 m$^2$/g.

The Raman spectrum of the conductive composite material of graphene A-11 obtained in Example 5 was obtained by the test method as described above. The results showed a D peak at 1354 cm$^{-1}$, and a G peak at 1580 cm$^{-1}$ with a ratio of their peak heights ($I_D/I_G$) of 0.08.

Example 6

(1) 25 g of 4-bromobenzenediazonium tetrafluoroborate was dissolved in 25 mL of water to obtain solution A. Under intense stirring, the solution A was dripped into 15 g of an aqueous dispersion of graphene nano-sheets (with 5 g of graphene nano-sheets). The mixture was stirred at room temperature for 1 h, then poured into acetone, and filtered to get solids, which were washed with acetone, DMF and deionized water for once respectively, and dried in vacuum (at a temperature of 60° C. for 4h), to obtain the pretreated graphene nano-sheets, recorded as A-1.

(2) 1 g of A-1 was ultrasonically dispersed in 100 mL of N,N'-dimethylformamide. Under nitrogen atmosphere, 324 mg of 2,7-dibromofluorene, 138.6 mg of 1,4-diethynylbenzene, 35 mg of tetra(triphenylphosphine) palladium, 7 mg of cuprous iodide and 4 mL of triethylamine were added into the dispersion. The reaction mixture was heated to 100° C. under nitrogen atmosphere and stirred for 72 hours.

(3) After the reaction, the reaction liquid was poured into methanol. The mixture was filtered in vacuum to obtain a dark green solid product. Subsequently, the obtained product was washed with methanol and deionized water for several times to remove the unreacted monomers and catalysts, and dried in a vacuum oven (at a temperature of 60° C. for 12 h) to obtain a conductive composite material of graphene, A-12, which was graphene nano-sheets grafted with copolymers of fluorene, wherein the graphene nano-sheets were in a mass content of 92.1%.

The specific surface area of A-12 was detected according to the BET method as described above. The results showed that the conductive composite material of graphene A-12 had a specific surface area of 160 m$^2$/g.

The Raman spectrum of the conductive composite material of graphene A-12 obtained in Example 6 was obtained by the test method as described above. The results showed a D peak at 1354 cm$^{-1}$, and a G peak at 1570 cm$^{-1}$ with a ratio of their peak heights ($I_D/I_G$) of 0.15.

Example 7

(1) 25 g of 4-bromobenzenediazonium tetrafluoroborate was dissolved in 25 mL of water to obtain solution A.

Under intense stirring, the solution A was dripped into 15 g of an aqueous dispersion of graphene nano-sheets (with 5 g of graphene nano-sheets). The mixture was stirred at room temperature for 1 h, then poured into acetone, filtered to get solids, which were washed with acetone, DMF and deionized water for once respectively, and dried in vacuum (at a temperature of 60° C. for 4 h), to obtain the pretreated graphene nano-sheets, recorded as A-1.

(2) 1 g of A-1 was ultrasonically dispersed in 100 mL of N,N'-dimethylformamide. Under nitrogen atmosphere, 241.9 mg of 2,5-dibromothiophene, 138.6 mg of 1,4-diethynylbenzene, 35 mg of tetra(triphenylphosphine) palladium, 7 mg of cuprous iodide and 4 mL of triethylamine were added into the dispersion. The reaction mixture was heated to 80° C. under nitrogen atmosphere and stirred for 72 hours.

(3) After the reaction, the reaction liquid was poured into methanol. The mixture was filtered in vacuum to obtain a claret solid product. Subsequently, the obtained product was washed with methanol and deionized water for several times to remove the unreacted monomers and catalysts, and dried in a vacuum oven (at a temperature of 60° C. for 12 h) to obtain a conductive composite material of graphene, A-13, which was graphene nano-sheets grafted with copolymers of thiophene, wherein the graphene nano-sheets were in a mass content of 90.5%.

The specific surface area of A-13 was detected according to the BET method as described above. The results showed that the conductive composite material of graphene A-13 had a specific surface area of 150 m$^2$/g.

The Raman spectrum of the conductive composite material of graphene A-13 obtained in Example 7 was obtained by the test method as described above. The results showed a D peak at 1354 cm$^{-1}$, and a G peak at 1580 cm$^{-1}$ with a ratio of their peak heights ($I_D/I_G$) of 0.07.

Example 8

(1) 100 g of expandable graphite (75 mesh) was subjected to expansion treatment at 900° C. for 20s to obtain pre-expanded graphite. As compared with the expandable graphite, the pre-expanded graphite had an expansion rate of 220 times.

(2) 10 g of the pre-expanded graphite obtained in the step (1), 0.25 g of Surfonic T-10 (available from Huntsman Chemical Trading (Shanghai) Co., Ltd., an aliphatic amine polyoxyethylene ether with HLB value of 12.4), and 239.75 g of deionized water were added together into a high-pressure homogenizer. They were homogenized for 30 min at 30 MPa, and then homogenized, by increasing the pressure, for 30 min at 45 MPa, to obtain a slurry containing stacks of graphene nano-sheets.

(3) The slurry was subjected to drying with a spray drying device, wherein the inlet stream was controlled at a temperature of 350° C., the outlet stream at a temperature of 100° C., and the centrifugal disc of the spray drying device at a rotating speed of 20000 rpm. The powders collected at the outlet were the stacks of graphene nano-sheets.

0.1 g of the above stacks of graphene nano-sheets were ultrasonically dispersed in ethanol solvent for 10 min to separate the stacks of graphene nano-sheets into corresponding graphene nano-sheets. Subsequently, the above dispersion was dropped on a slide, dried at room temperature, and detected by the test method as described above to obtain the Raman spectrum of the obtained graphene nano-sheets. The results showed a D peak at 1350 cm$^{-1}$, and a G peak at 1575 cm$^{-1}$ with a ratio of their peak heights ($I_D/I_G$) of 0.05.

Example 1 was repeated excepted that the nano-sheet feedstocks were replaced with the obtained graphene nano-sheets, to prepare the conductive composite material of graphene A-14.

The specific surface area of A-14 was detected according to the BET method as described above. The results showed that the conductive composite material of graphene A-14 had a specific surface area of 175 m$^2$/g. The Raman spectrum of the obtained conductive composite material of graphene A-14 was obtained. The results showed a D peak at 1355 cm$^{-1}$, and a G peak at 1580 cm$^{-1}$ with a ratio of their peak heights ($I_D/I_G$) of 0.05.

Comparative Example 1

(1) 1 g of the graphene nano-sheet feedstocks was ultrasonically dispersed in 100 mL of N,N'-dimethylformamide. Under nitrogen atmosphere, 326 mg of 4,4'-dibromotriphenylamine, 138.6 mg of 1,4-diethynylbenzene, 35 mg of tetra(triphenylphosphine) palladium, 7 mg of cuprous iodide and 4 mL of triethylamine were added into the dispersion. The reaction mixture was heated to 80° C. under nitrogen atmosphere and stirred for 72 hours.

(2) After the reaction, the reaction liquid was poured into methanol. The mixture was filtered in vacuum to obtain a black solid. Subsequently, the obtained mixture was washed with methanol and deionized water for several times to remove the unreacted monomers and catalysts, and dried in a vacuum oven (at a temperature of 60° C. for 12 h). The obtained mixture was added into toluene at 80° C., and then it was found that the solution turned brown, and there were black flocculent precipitates in the solution.

The specific surface area of the product of Comparative Example 1 was detected according to the BET method as described above. The results showed that the product of Comparative Example 1 had a specific surface area of 400 m$^2$/g, which was substantially consistent with that of the graphene nano-sheet feedstocks. It indicated that the polymers were not grafted to the surface of the graphene nano-sheets.

The above results showed that the flocculent precipitates were unreacted graphene nano-sheet feedstocks, while the conjugated copolymers obtained from the polymerization of 4,4'-dibromotriphenylaminde and 1,4-diethynylbenzene were dissolved in the solvent.

Application Example 1

A negative electrode was prepared with the conductive composite material of graphene A-2 obtained in Example 1 as the conductive agent and a silicon-carbon material as the active material. In particular, 8 g of the silicon-carbon material, 1 g of A-2 as the conductive agent and 1 g of an adhesive (polymethylacrylic acid) were added into a 50 ml beaker, and stirred for 30 min at 800 rpm to obtain a negative electrode slurry. The above negative electrode slurry was evenly coated with a coating machine on a copper foil (with a thickness of 100 μm), and dried in a vacuum drying box at 80° C. overnight, to obtain the negative electrode in accordance with the present disclosure. The SEM image of the negative electrode was obtained with the scanning electron microscope, which was shown in FIG. 6.

Then, a CR2016 coin cell was assembled by using the above negative electrode, a metal lithium sheet as positive electrode, 1 mol/L LiPF$_6$ solution as electrolyte (wherein a mixture of vinyl carbonate and diethyl carbonate in a ratio of 3:7 by volume was used as solvents) and a polypropylene microporous film as separator. The prepared coin cell was subjected to the test methods as described above to characterize the cycle performances at different current rates. The results were shown in FIG. 8.

Application Example 2

The Application Example 1 was repeated by using the commercially available SuperP as the conductive agent to prepare a control negative electrode. The SEM image of the control negative electrode was obtained with the scanning electron microscope, which was shown in FIG. 7.

Then, a CR2016 coin cell was assembled by using the above control negative electrode, a metal lithium sheet as positive electrode, 1 mol/L LiPF$_6$ solution as electrolyte (wherein a mixture of vinyl carbonate and diethyl carbonate in a ratio of 3:7 by volume was used as solvents) and a polypropylene microporous film as separator. The prepared coin cell was subjected to the test methods as described above to characterize the cycle performances at different current rates. The results were shown in FIG. 8.

Figure 6:
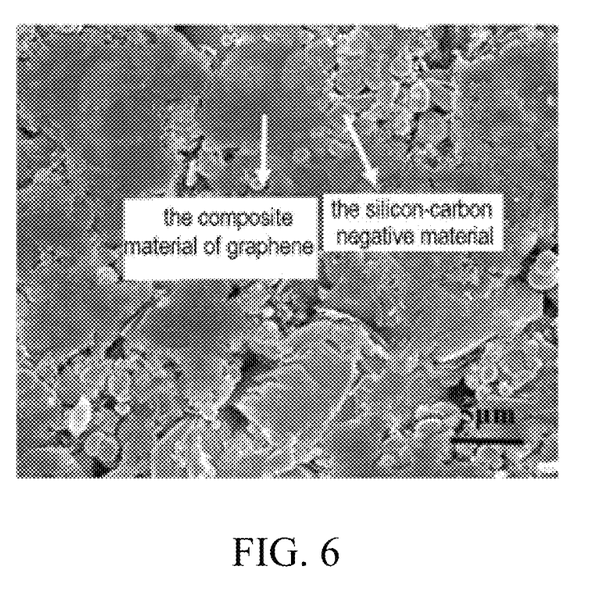
FIG. 6 shows a SEM image (top view) of the negative electrode in accordance with the present disclosure in Application Example 1.
Figure 7:
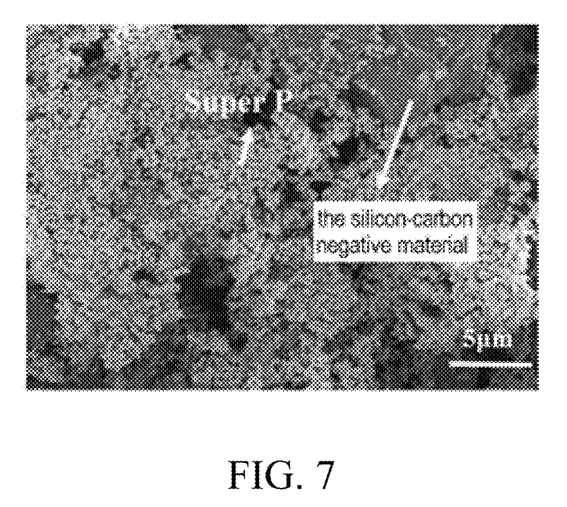
FIG. 7 shows a SEM image (top view) of the control negative electrode in Application Example 2.

Referring to FIG. 6 and FIG. 7, they were SEM images of the negative electrode in accordance with the present disclosure and the control negative electrode, obtained in Application Example 1 and Application Example 2 respectively. As could be seen from the drawings in FIG. 6, the conductive composite material of graphene was coated on the surface of particles of the silicon-carbon negative material. Without being bound by any theory, it is believed that such structure was advantageous not only for forming the surface conduction of electrons, but also for buffering the volume expansion of the silicon-carbon material during charge-discharge cycling, thus improving the cycle performances of the cell. In FIG. 7, Super P was dispersed among particles of the silicon-carbon negative material. Accordingly, the conduction mode of electrons is linear. Additionally, there was no contribution to alleviating the volume expansion of the silicon-carbon material.

Figure 8:
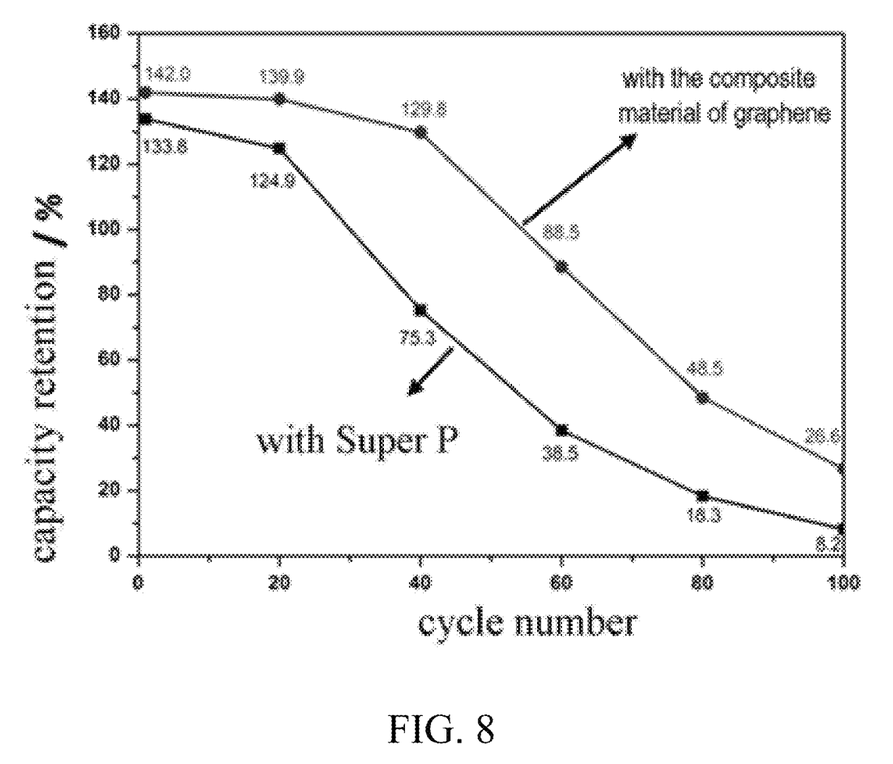
FIG. 8 shows the cycle performances at different current rates of the cells obtained in Application Example 1 and Application Example 2.

Referring to FIG. 8, it showed the cycle performances at different current rates for the cells obtained in Application Example 1 and Application Example 2. As could be seen from the drawings, the cell using the negative electrode in accordance with the present disclosure achieved higher capacity retention at the same cycle numbers. The negative electrode in accordance with the present disclosure used the conductive composite material of graphene A-2 as the conductive agent. It indicated that A-2 could improve conductivity of the electrode, inhibit the occurrence of battery polarization, and improve the stability of the battery.

The preferred embodiments of the present invention have been described in detail above. However, the present invention is not limited thereto. Various simple modifications may be made to the embodiments of the present invention within the technical scope of the present invention, including the combinations of various technical features in any other suitable way. Those simple modifications and combinations should also be regarded as the contents disclosed herein and being within the protection scope of the present disclosure.

The invention claimed is:

1. A conductive composite material of graphene, comprising graphene nano-sheets and a conjugated copolymer, wherein the conjugated copolymer comprises alkynyl groups, has a linear structure, and is grafted to the graphene nano-sheets,
   wherein the graphene nano-sheets are low-layer graphene comprising 3-5 layers of graphene,
   wherein the graphene nano-sheets involve in their Raman spectrum a D peak and a G peak which have the peak heights of Ip and IG, respectively, whereinwhere $I_D/I_G$ is 0.03-0.30, and
   wherein the conductive composite material of graphene has a conductivity of 200-800 S/cm.

2. The conductive composite material of graphene according to claim 1, wherein the conductive composite material of graphene has a specific surface area of 50-300m$^2$/g.

3. The conductive composite material of graphene according to claim 2, wherein the conductive composite material of graphene has a specific surface area of 100-250 m$^2$/g.

4. The conductive composite material of graphene according to claim 1, wherein, based on a total amount of the conductive composite material of graphene, the graphene nano-sheets are present in an amount of 85%-99% by mass, and the conjugated copolymer is present in an amount of 1%-15% by mass.

5. The conductive composite material of graphene according to claim 1, wherein the graphene nano-sheets has plane dimensions of 0.05-5.0 μm.

6. The conductive composite material of graphene according to claim 1, wherein the conjugated copolymer is one or more copolymer selected from copolymers of arylalkyne, copolymers of fluorene, copolymers of p-phenylenevinylene, copolymers of p-phenyleneethynylene, copolymers of thiophene, copolymers of thiophene derivatives, copolymers of pyrrole and copolymers of pyrrole derivatives.

7. A method for preparing the conductive composite material of graphene according to claim 1, comprising the steps of:
   pretreating the graphene nano-sheets with 4-bromobenzenediazonium tetrafluoroborate; and
   forming the conjugated copolymer in the presence of the pretreated graphene nano-sheets.

8. The method according to claim 7, wherein the pretreating comprises the steps of:
   under stirring, dripping an aqueous solution of 4-bromobenzenediazonium tetrafluoroborate into an aqueous dispersion of the graphene nano-sheets, and treating at a temperature of −5° C. to 40° C. for 30-180 min, then drying to obtain the pretreated graphene nano-sheets.

9. The method according to claim 8, wherein the aqueous solution of 4-bromobenzenediazonium tetrafluoroborate has a concentration of 40%-70% by mass, and the graphene nano-sheets are present in a concentration of 5%-50% by mass in the aqueous dispersion of the graphene nano-sheets.

10. The method according to claim 9, wherein the monomers comprise at least a first monomer containing halogen and a second monomer comprises an alkynyl group.

11. The method according to claim 9, wherein the catalyst is at least one selected from palladium catalysts and nickel catalysts.

12. The method according to claim 9, wherein the polymerizing is carried out under in an inert atmosphere and at a temperature of 80-150° C. for 12 h to 36 h.

13. The method according to claim 8, wherein 4-bromobenzenediazonium tetrafluoroborate and the graphene nano-sheets are in a mass ratio of 3-6:1.

14. The method according to claim 8, wherein the drying is drying in vacuum at a temperature of 60-80° C. for 2-10 h.

15. The method according to claim 7, wherein the forming the conjugated copolymer comprising polymerizing monomers in the presence of a catalyst, a solvent, and the pretreated graphene nano-sheets to obtain the conductive composite material of graphene.

16. A lithium-ion battery, comprising the conductive composite material of graphene according to claim 1.

17. The conductive composite material of graphene according to claim 1, wherein the conjugated copolymer is one or more copolymer selected from arylalkyne, copolymers of fluorene, copolymers of thiophene, and copolymers of thiophene derivatives.

18. The conductive composite material of graphene according to claim 1, wherein the conjugated copolymer is one or more copolymer selected from poly (1,4-dialkynylbenzene-co-triphenylamine), poly (1,4-dialkynylbenzene-co-9-hexylfluorene), poly (1,4-dialkynylbenzene-co-3-hexylthiophene), poly (1,4-dialkynylbenzene-co-thiophene), and poly (1,4-dialkynylbenzene-co-3,4-ethylene dioxy thiophene).

* * * * *